(12) United States Patent
Shih et al.

(10) Patent No.: US 9,739,925 B2
(45) Date of Patent: Aug. 22, 2017

(54) LIGHT-EMITTING MODULE

(71) Applicant: E Ink Holdings Inc., Hsinchu (TW)

(72) Inventors: Yao-Tsung Shih, Hsinchu (TW);
Mei-Chen Chang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 266 days.

(21) Appl. No.: 14/540,042

(22) Filed: Nov. 13, 2014

(65) Prior Publication Data

US 2015/0212251 A1    Jul. 30, 2015

(30) Foreign Application Priority Data

Jan. 29, 2014    (TW) ............................ 103103617 A

(51) Int. Cl.
*F21V 8/00* (2006.01)

(52) U.S. Cl.
CPC ......... *G02B 6/0031* (2013.01); *G02B 6/0068* (2013.01)

(58) Field of Classification Search
None
See application file for complete search history.

(56) References Cited

U.S. PATENT DOCUMENTS

| | | | |
|---|---|---|---|
| 6,742,907 B2 * | 6/2004 | Funamoto | G02B 6/0036 349/63 |
| 7,083,317 B2 | 8/2006 | Higashiyama | |
| 7,192,176 B2 | 3/2007 | Lo et al. | |
| 7,507,012 B2 | 3/2009 | Aylward et al. | |
| 7,548,287 B2 | 6/2009 | Oh | |
| 7,982,818 B2 | 7/2011 | Chung et al. | |
| 8,212,955 B2 | 7/2012 | Tang | |
| 8,253,894 B2 | 8/2012 | Ohmi et al. | |
| 8,330,708 B2 | 12/2012 | Park et al. | |
| 8,355,093 B2 | 1/2013 | Shin et al. | |
| 8,441,596 B2 | 5/2013 | Shiraishi et al. | |
| 8,931,943 B2 * | 1/2015 | Kunimochi | G02B 6/0011 362/609 |

(Continued)

FOREIGN PATENT DOCUMENTS

CN    1258113 C    5/2006
CN    200965602 Y    10/2007

(Continued)

OTHER PUBLICATIONS

Corresponding Taiwanese Office Action that these art references were cited on Sep. 18, 2015.

(Continued)

*Primary Examiner* — Sharon Payne
(74) *Attorney, Agent, or Firm* — CKC & Partners Co., Ltd.

(57) ABSTRACT

The present disclosure provides a light-emitting module. The light-emitting module includes a light guide, a plurality of light source and a light-adjusting film. The light-adjusting film has a first light absorption portion, a plurality of second light absorption portions and a plurality of light reflection portions. The second light absorption portions are individually extended from the projection position of the light sources on the first light absorption portion, and may absorb part of the light in front of the light sources; and each of the light reflection portions is between two of the adjacent second light adsorption portions, and may reflect the light shinning thereon.

18 Claims, 8 Drawing Sheets

(56) References Cited

U.S. PATENT DOCUMENTS

| | | | |
|---|---|---|---|
| 2003/0043157 A1* | 3/2003 | Miles | G01L 5/0047 345/540 |
| 2009/0052031 A1* | 2/2009 | Yamada | G02B 27/285 359/489.01 |
| 2011/0305004 A1 | 12/2011 | Kim et al. | |
| 2012/0262643 A1 | 10/2012 | Kweon et al. | |

FOREIGN PATENT DOCUMENTS

| | | |
|---|---|---|
| CN | 102213385 A | 10/2011 |
| CN | 202600179 U | 12/2012 |
| JP | 209004197 A | 1/2009 |
| JP | 2009004197 A | 1/2009 |
| JP | 2010243959 A | 10/2010 |
| TW | 200304022 A | 9/2003 |

OTHER PUBLICATIONS

Corresponding Chinese Office Action that these art references were cited on Sep. 29, 2016.

* cited by examiner

LIGHT-EMITTING MODULE

RELATED APPLICATIONS

This application claims priority to Taiwanese Application Serial Number 103103617 filed Jan. 29, 2014, which is herein incorporated by reference.

BACKGROUND

Technical Field

The present disclosure relates to a light-emitting module, and more particularly, to a light-emitting module having a light-adjusting film.

Description of Related Art

In a conventional display device, a light-emitting module is indispensable. The light-emitting module is usually composed of a light guide plate, a light source and a light-blocking strip. The light source emits light toward a light-entering surface of the light guide plate, and the light may be uniformly extracted from a light-extracting surface of the light guide plate by an undulating microstructure of the light guide plate.

When the light source is connected with the light guide plate, a crack between the both may generate a light leak, the light-blocking strip is usually used to cover the crack between the light source and the light guide plate to improve the light leak. Generally, the light-blocking strip may be a light absorption strip or a light reflection strip to absorb or reflect light into the light guide plate.

Commonly, light-emitting diodes (LEDs) are used as a light source of the light-emitting module to provide higher brightness and energy-saving property. However, the LED is a point source, which may generate a hot spot while applying in a light-emitting module, so as to cause a nonuniform brightness at a side frame of the display device. Therefore, there is a need for an improved light-emitting module, so as to solve the aforementioned problems met in the art.

SUMMARY

The present disclosure provides a light-emitting module, so as to solve the aforementioned problems met in the art.

One embodiment of the present disclosure is to provide a light-emitting module. The light-emitting module comprises a light guide plate, a plurality of light sources and a first light-adjusting film.

The light guide plate has a light-entering surface, a first light-extracting surface and a second light-extracting surface opposite to the first light-extracting surface, wherein the first light-extracting surface has a light-adjusting area. The light sources emit light toward the light-entering surface of the light guide plate.

The first light-adjusting film has a first light absorption portion, a plurality of second light absorption portions and a plurality of first light reflection portions. The first light absorption portion is positioned over the light sources, and the second light absorption portions and the first light reflection portions are positioned on the light-adjusting area of the first light-extracting surface. The second light absorption portions are extended from the first light absorption portion, and one of the first light reflection portions is located between two neighboring second light absorption portions, so that the second light absorption portions and the first light reflection portions are alternately arranged.

According to one embodiment of the present disclosure, the first light absorption portion and the second light absorption portions are black.

According to one embodiment of the present disclosure, the first light absorption portion and the second light absorption portions have a rough surface.

According to one embodiment of the present disclosure, the first light reflection portions are white.

According to one embodiment of the present disclosure, the first light reflection portions further comprise a reflective layer.

According to one embodiment of the present disclosure, the reflective layer is a metal layer.

According to one embodiment of the present disclosure, the material of the metal layer includes silver, aluminum or tin.

According to one embodiment of the present disclosure, a pattern of the first light reflection portions is in rectangle, trapezoid, triangle, semicircle, semiellipse or a combination thereof.

According to one embodiment of the present disclosure, a distance between two neighboring light sources is in a range of about 1 cm to 2 cm.

According to one embodiment of the present disclosure, the second light absorption portions are extended in a range of about 0.3 cm to 1 cm, from the first light absorption portion.

According to one embodiment of the present disclosure, the light sources are a point source.

According to one embodiment of the present disclosure, the point source is a light-emitting diode.

According to one embodiment of the present disclosure, a width of the light sources is in a range of about 3 mm to 6 mm.

According to one embodiment of the present disclosure, a width of the second light absorption portions is greater than the width of the light sources.

According to one embodiment of the present disclosure, the first light absorption portion and the second light absorption portions are formed a comb structure.

According to one embodiment of the present disclosure, the light-emitting module further comprises a second light-adjusting film having a third light absorption portion, a plurality of fourth light absorption portions and a plurality of second light reflection portions. The third light absorption portion is positioned under the light sources. The fourth light absorption portions and the second light reflection portions are positioned on a light-adjusting area of the second light-extracting surface. The fourth light absorption portions are extended from the third light absorption portion, and one of the second light reflection portions is located between two neighboring fourth light absorption portions, so that the fourth light absorption portions and the second light reflection portions are alternately arranged.

Another embodiment of the present disclosure is to provide a display device. The display device comprises a display unit and the light-emitting module as mentioned above. The display unit has a display surface, and the light-emitting module is positioned on the display unit. The second light-extracting surface of the light guide plate of the light-emitting module is toward the display surface of the display unit.

According to one embodiment of the present disclosure, the display unit is a reflective display unit.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
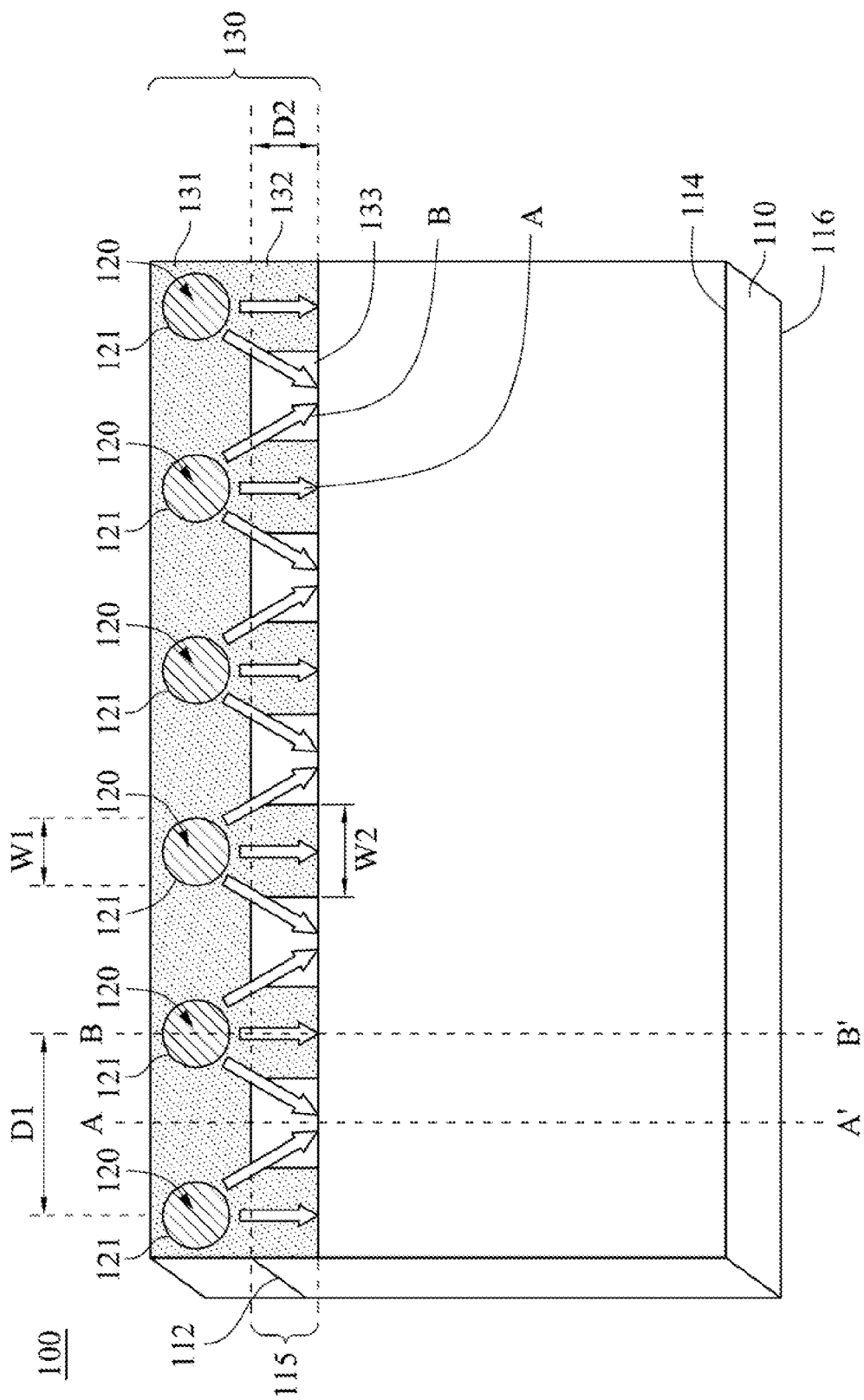
FIG. 1A is a schematic three-dimensional view of a light-emitting module 100 according to one embodiment of the present disclosure, in which the arrow presents a light.

The embodiments of the transparent heat-conducting structure and a method for manufacturing the same of the present disclosure are discussed in detail below, but not limited the scope of the present disclosure. The same symbols or numbers are used to the same or similar portion in the drawings or the description. And the applications of the present disclosure are not limited by the following embodiments and examples which the person in the art can apply in the related field.

The singular forms "an" and "the" used herein include plural referents unless the context clearly dictates otherwise. Therefore, reference to, for example, a metal layer includes embodiments having two or more such metal layers, unless the context clearly indicates otherwise. Reference throughout this specification to "one embodiment" means that a particular feature, structure, or characteristic described in connection with the embodiment is included in at least one embodiment of the present disclosure. Therefore, the appearances of the phrases "in one embodiment" or "in an embodiment" in various places throughout this specification are not necessarily all referring to the same embodiment. Further, the particular features, structures, or characteristics may be combined in any suitable manner in one or more embodiments. It should be appreciated that the following figures are not drawn to scale; rather, the figures are intended; rather, these figures are intended for illustration.

For providing higher brightness and energy-saving property, light-emitting diodes (LEDs) are commonly used as a light source of the light-emitting module. However, the LED is a point source, which may generate a hot spot while applying in a light-emitting module, so as to cause a nonuniform brightness at a side frame of the display device.

One embodiment of the present disclosure is to provide a light-emitting module comprising a light guide plate, a plurality of light sources and a light-adjusting film. In embodiments of the present disclosure, the light-adjusting film may be used to improve the hot spot of the light-emitting module, and have a uniform brightness at a side frame of the display device.

Figure 1B:
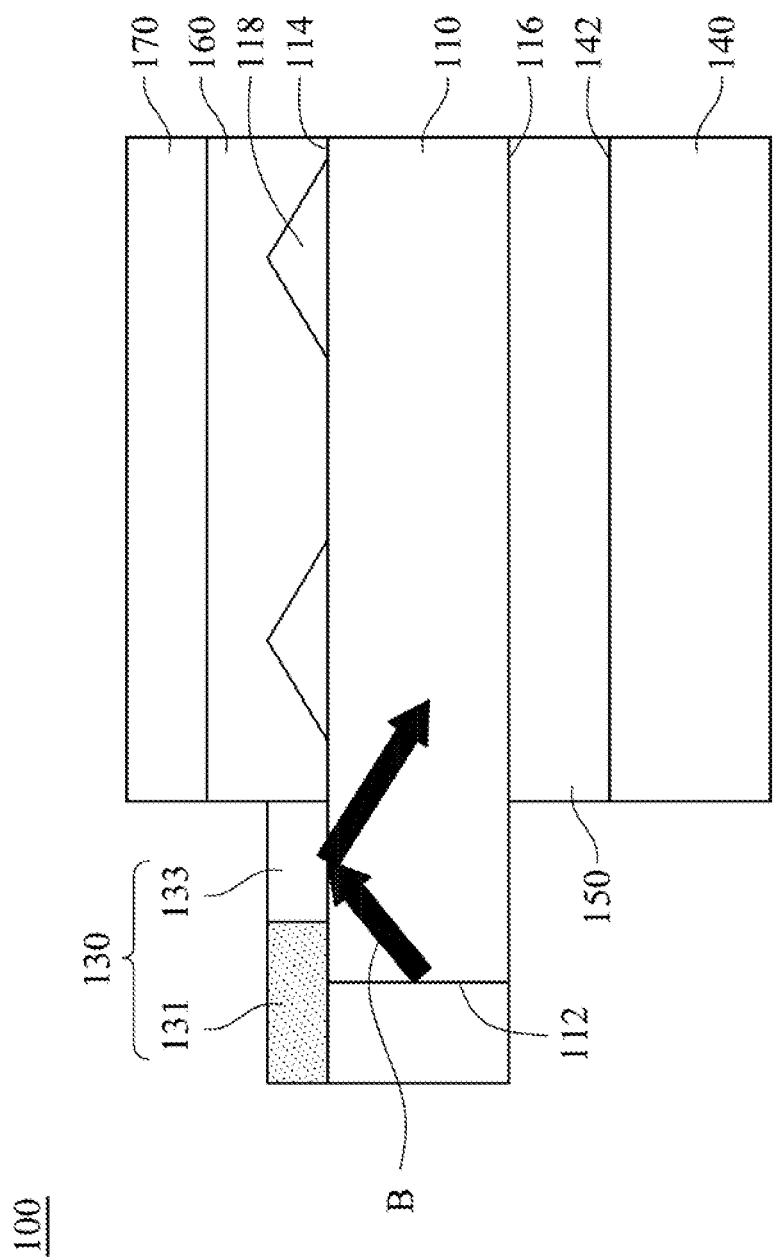
FIG. 1B is schematic cross-sectional view of the light-emitting module material 100 taken along A-A line of FIG. 1A, in which the arrow presents a light.
Figure 1C:
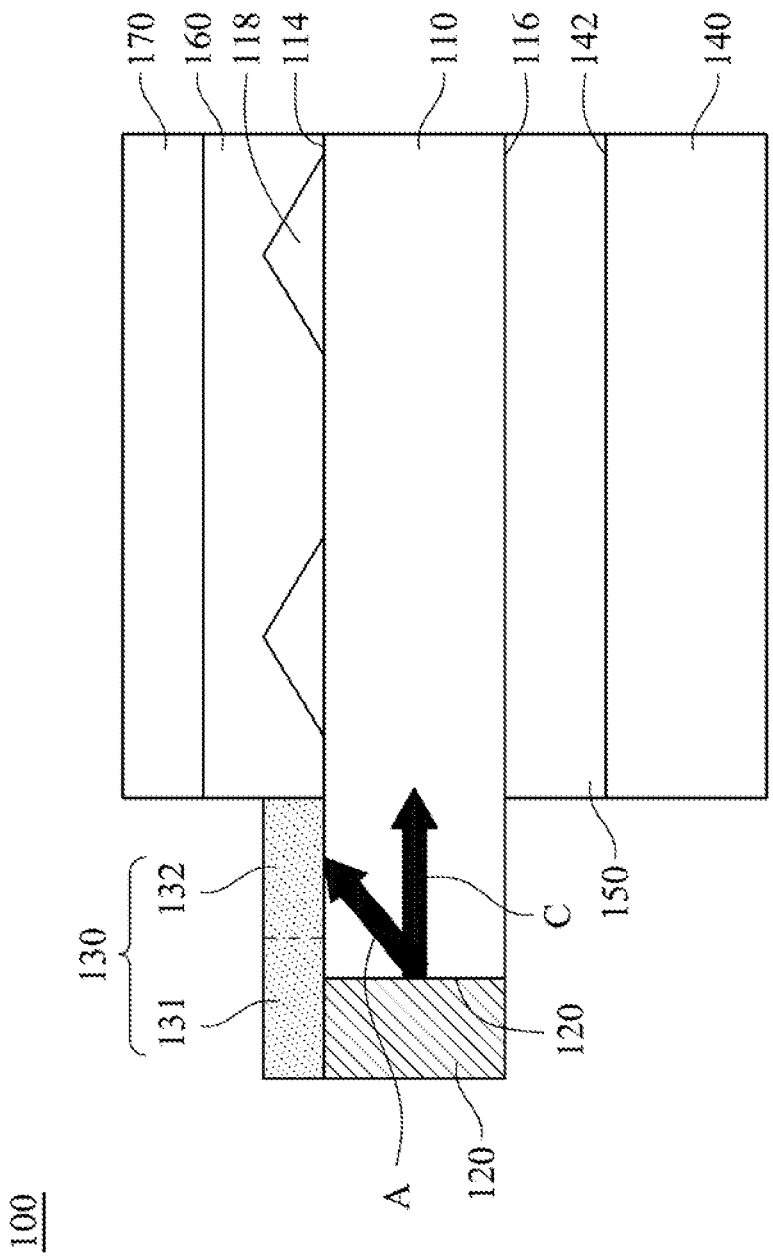
FIG. 1C is schematic cross-sectional view of the light-emitting module material 100 taken along B-B' line of FIG. 1A, in which the arrow presents a light.

Referring to FIGS. 1A, 1B and 1C, FIG. 1A is a schematic three-dimensional view of a light-emitting module 100 according to one embodiment of the present disclosure; FIG. 1B is schematic cross-sectional view of the light-emitting module material 100 taken along A-A line of FIG. 1A; and FIG. 1C is schematic cross-sectional view of the light-emitting module material 100 taken along B-B' line of FIG. 1A.

In FIG. 1A, the light-emitting module material 100 comprises a light guide plate 110, a plurality of light sources 120 and a first light-adjusting film 130.

The light guide plate 110 has a light-entering surface 112, a first light-extracting surface 114 and a second light-extracting surface 116. The second light-extracting surface 116 is opposite to the first light-extracting surface 114, and the first light-extracting surface 114 has a light-adjusting area 115.

The light sources 120 emit light toward the light-entering surface 112 of the light guide plate 110. In an embodiment of the present disclosure, the light sources 120 are a point source such as a light-emitting diode. According to the brightness of the light sources, the distance (D1) between two neighboring light sources can be adjusted. When the brightness of the light source becomes higher, the distance (D1) between two neighboring light sources becomes longer. In an embodiment of the present disclosure, the distance (D1) between two neighboring light sources is, but not limited to, in a range of about 1 cm to 2 cm. In an embodiment of the present disclosure, a width (W1) of the light sources is in a range of about 3 cm to 6 cm.

The first light-adjusting film 130 has a first light absorption portion 131, a plurality of second light absorption portions 132 and a plurality of first light reflection portions 133. The first light absorption portion 131 is positioned over the light sources 120, and the second light absorption portions 132 and the first light reflection portions 133 are positioned on the light-adjusting area 115 of the first light-extracting surface 114.

There is a distance between two neighboring light sources, so that highlights may appear in front of the light sources 120, and shadows may appear between two neighboring light sources. In FIG. 1A, the second light absorption portions 132 are extended from projection positions 121 of the light sources 120 on the first light absorption portion 131, so as to absorb a part of light. A in front of the light sources 120 to reduce the brightness of highlights. In an embodiment of the present disclosure, the first light absorption portion 131 and the second light absorption portions 132 are in black. In an embodiment of the present disclosure, the first light absorption portion 131 and the second light absorption portions 132 have a rough surface. In an embodiment of the present disclosure, the second light absorption portions 132 are extended in a range (D2) of about 0.3 cm to 1 cm, from the first light absorption portion 131. In an embodiment of the present disclosure, a width (W2) of the second light absorption portions 132 is greater than a width (W1) of the light sources (120).

In addition, one of the first light reflection portions 133 is located between two neighboring second light absorption portions 132 to reflect a light B shinning on the first light reflection portions 133, so as to enhance the brightness of the shadows. In an embodiment of the present disclosure, the first light reflection portions 133 further comprise a reflective layer. The reflective layer may be a metal layer, and the material of the metal layer includes silver, aluminum or tin. In an embodiment of the present disclosure, a pattern of the first light reflection portions may be, but not limited to, in rectangle, trapezoid, triangle, semicircle, semiellipse or a combination thereof. In FIG. 1A, the pattern of the first light reflection portions 133 is in rectangle.

In FIG. 1A, the second light absorption portions 132 and the first light reflection portions 133 are alternately arranged. In an embodiment of the present disclosure, the first light absorption portion 131 and the second light absorption portions 132 are formed a comb structure.

In FIG. 1B, the light B enters into the light guide plate 110 through the light-entering surface 112 of the light guide plate 110. The first light reflection portions 133 can reflect the light B to keep the light B entering into the light guide plate 110.

In FIG. 1B, the first light-extracting surface 114 of the light guide plate 110 has an undulating microstructure 118. A first optical clear adhesive (OCA) layer 160 covers the undulating microstructure 118 and the first light-extracting surface 114 of the light guide plate 110, and a transparent protection layer 170 covers the first OCA layer 160. The second light-extracting surface 116 of the light guide plate 110 is toward a display surface 142 of a display unit 140, and a second OCA layer 150 is sandwiched between.

In FIG. 1C, the light A from the light source 120 enters into the light guide plate 110 through the light-entering surface 112 of the light guide plate 110, and irradiates the second light absorption portion 132 of the light-adjusting film 130. The second light absorption portions 132 can absorb the light A and only keep the light C entering into the light guide plate 110.

Figure 2:
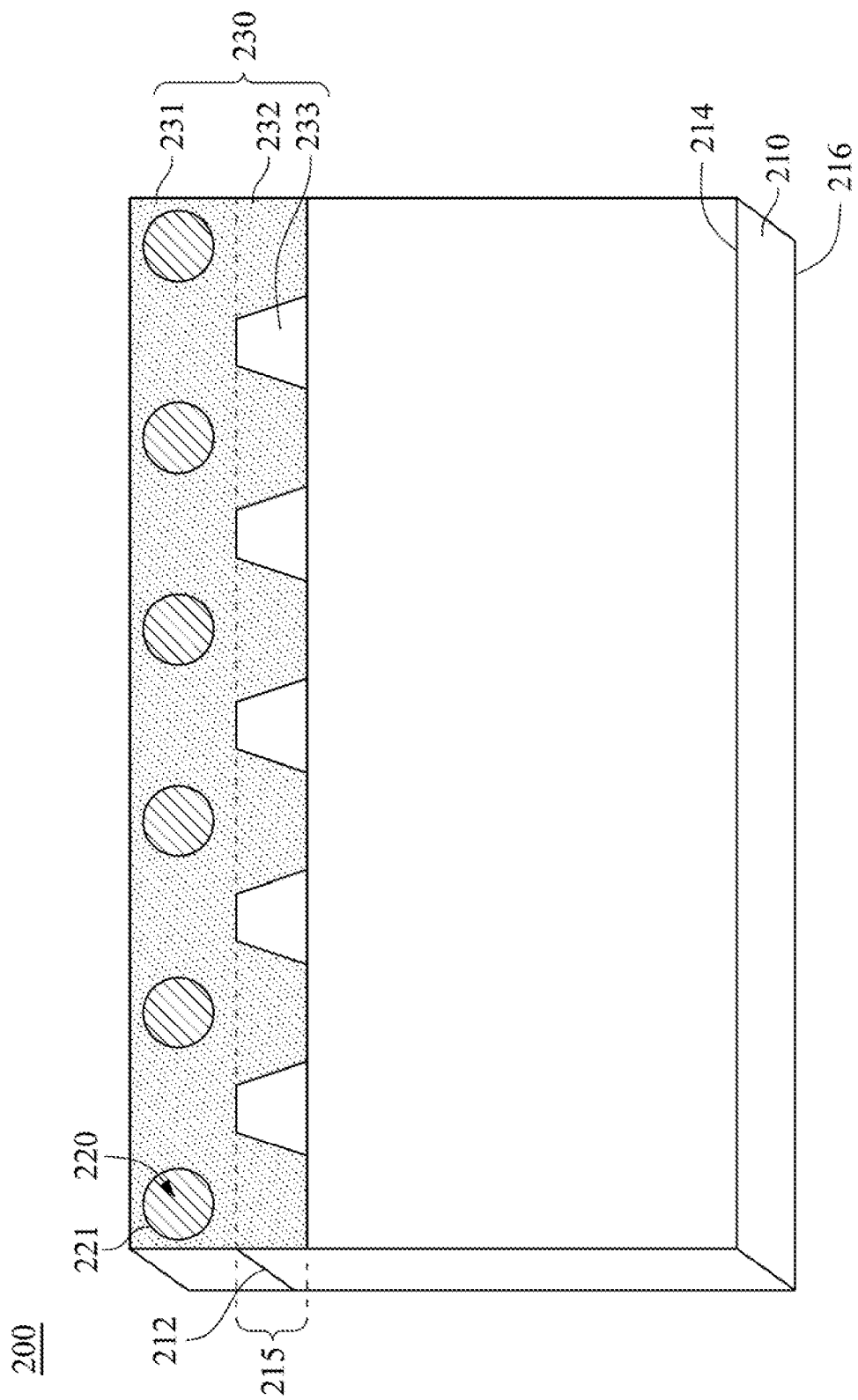
FIG. 2 is a schematic three-dimensional view of a light-emitting module 200 according to one embodiment of the present disclosure.

FIG. 2 is a schematic three-dimensional view of a light-emitting module 200 according to one embodiment of the present disclosure. In FIG. 2, the light-emitting module 200 comprises a light guide plate 210, a plurality of light sources 220 and a first light-adjusting film 230.

The light guide plate 210 has a light-entering surface 212, a first light-extracting surface 214 and a second light-extracting surface 216. The second light-extracting surface 216 is opposite to the first light-extracting surface 214, and the first light-extracting surface 214 has a light-adjusting area 215. The light sources 220 emit light toward the light-entering surface 212 of the light guide plate 210.

The first light-adjusting film 230 has a first light absorption portion 231, a plurality of second light absorption portions 232 and a plurality of first light reflection portions 233. The first light absorption portion 231 is positioned over the light sources 220, and the second light absorption portions 232 and the first light reflection portions 233 are positioned on the light-adjusting area 215 of the first light-extracting surface 214.

The second light absorption portions 232 are extended from projection positions 221 of the light sources 220 on the first light absorption portion 231, and one of the first light reflection portions 233 is located between two neighboring second light absorption portions 232, such that the second light absorption portions 232 and the first light reflection portions 233 are alternately arranged. In FIG. 2, the pattern of the first light reflection portions 233 is in trapezoid.

Figure 3:
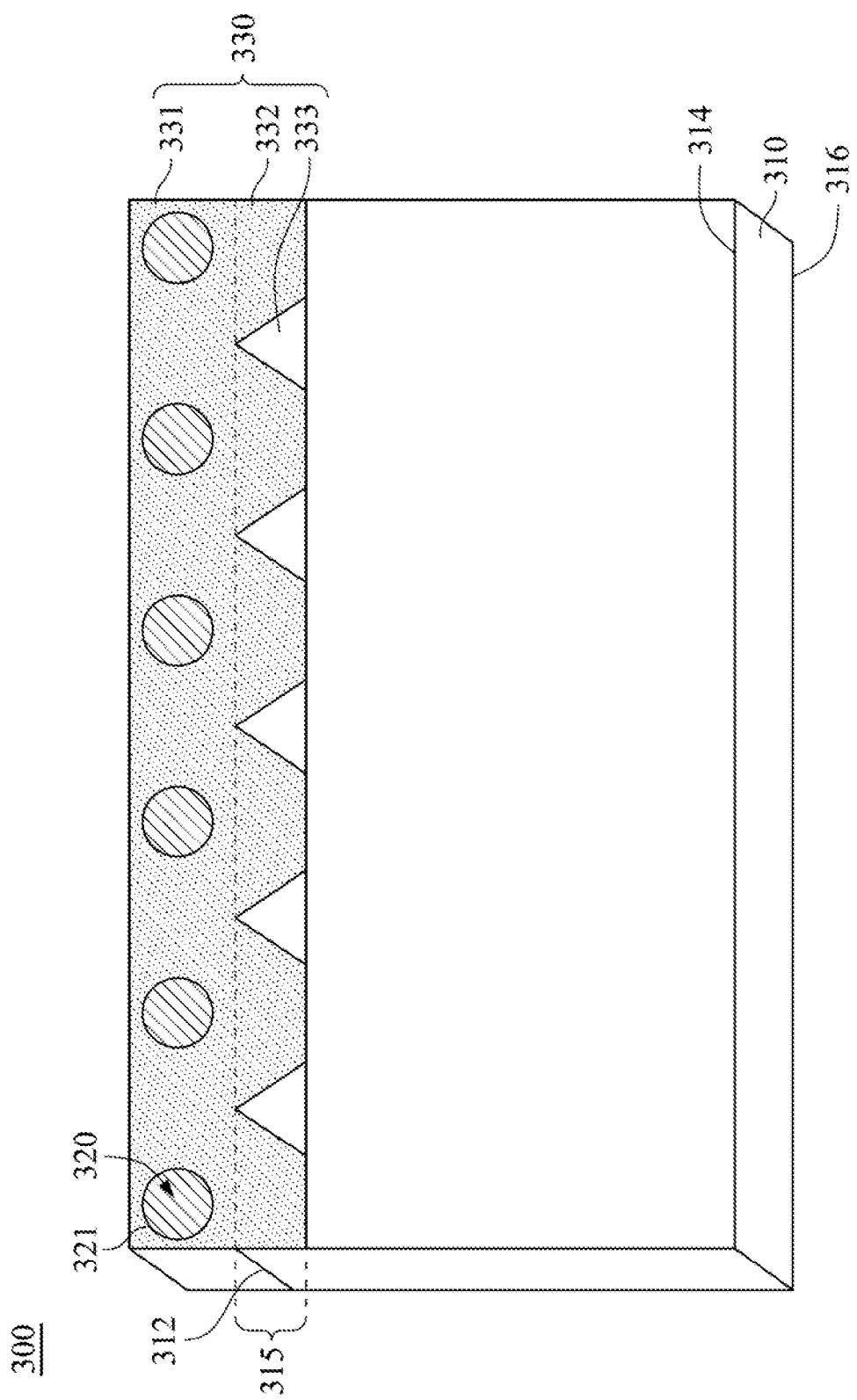
FIG. 3 is a schematic three-dimensional view of a light-emitting module 300 according to one embodiment of the present disclosure.

FIG. 3 is a schematic three-dimensional view of a light-emitting module 300 according to one embodiment of the present disclosure. In FIG. 3, the light-emitting module 300 comprises a light guide plate 310, a plurality of light sources 320 and a first light-adjusting film 330.

The light guide plate 310 has a light-entering surface 312, a first light-extracting surface 314 and a second light-extracting surface 316. The second light-extracting surface 316 is opposite to the first light-extracting surface 314, and the first light-extracting surface 314 has a light-adjusting area 315. The light sources 320 emit light toward the light-entering surface 312 of the light guide plate 310.

The first light-adjusting film 330 has a first light absorption portion 331, a plurality of second light absorption portions 332 and a plurality of first light reflection portions 333. The first light absorption portion 331 is positioned over the light sources 320, and the second light absorption portions 332 and the first light reflection portions 333 are positioned on the light-adjusting area 315 of the first light-extracting surface 314.

The second light absorption portions 332 are extended from projection positions 321 of the light sources 320 on the first light absorption portion 331, and one of the first light reflection portions 333 is located between two neighboring second light absorption portions 332, such that the second light absorption portions 332 and the first light reflection portions 333 are alternately arranged. In FIG. 3, the pattern of the first light reflection portions 333 is in triangle.

Figure 4:
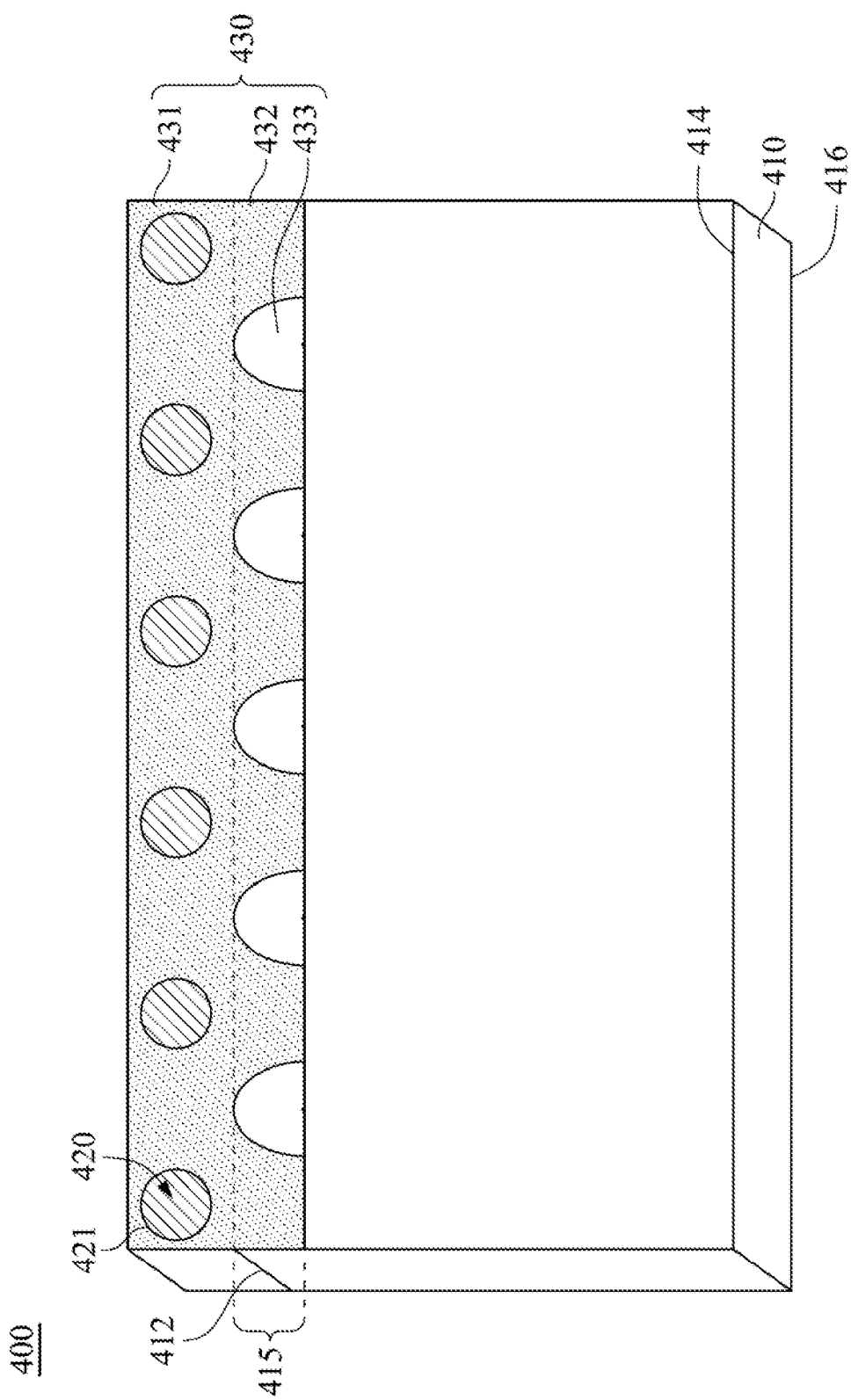
FIG. 4 is a schematic three-dimensional view of a light-emitting module 400 according to one embodiment of the present disclosure.

FIG. 4 is a schematic three-dimensional view of a light-emitting module 400 according to one embodiment of the present disclosure. In FIG. 4, the light-emitting module 400 comprises a light guide plate 410, a plurality of light sources 420 and a first light-adjusting film 430.

The light guide plate 410 has a light-entering surface 412, a first light-extracting surface 414 and a second light-extracting surface 416. The second light-extracting surface 416 is opposite to the first light-extracting surface 414, and the first light-extracting surface 414 has a light-adjusting area 415. The light sources 420 emit light toward the light-entering surface 412 of the light guide plate 410.

The first light-adjusting film 430 has a first light absorption portion 431, a plurality of second light absorption portions 432 and a plurality of first light reflection portions 433. The first light absorption portion 431 is positioned over the light sources 420, and the second light absorption portions 432 and the first light reflection portions 433 are positioned on the light-adjusting area 415 of the first light-extracting surface 414.

The second light absorption portions 432 are extended from projection positions 421 of the light sources 420 on the first light absorption portion 431, and one of the first light reflection portions 433 is located between two neighboring second light absorption portions 432, such that the second light absorption portions 432 and the first light reflection portions 433 are alternately arranged. In FIG. 4, the pattern of the first light reflection portions 433 is in semicircle.

Figure 5:
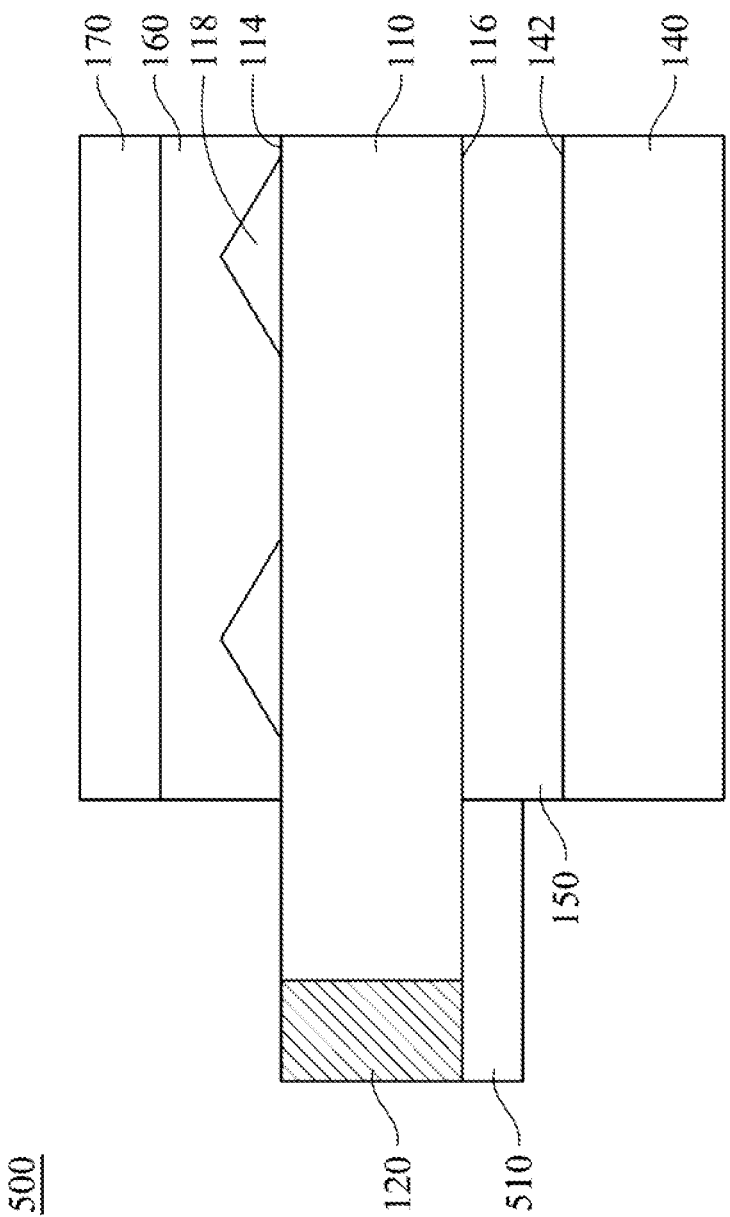
FIG. 5 is a schematic cross-sectional view of a light-emitting module 500 according to one embodiment of the present disclosure.

FIG. 5 is a schematic cross-sectional view of a light-emitting module 500 according to one embodiment of the present disclosure. In FIG. 5, a light-adjusting film 510 is positioned under the light source 120 and the second light-extracting surface 116 of the light guide plate 110. The first light-extracting surface 114 of the light guide plate 110 has an undulating microstructure 118. The first optical clear adhesive (OCA) layer 160 covers the undulating microstructure 118 and the first light-extracting surface 114 of the light guide plate 110, and the transparent protection layer 170 covers the first OCA layer 160. The second light-extracting surface 116 of the light guide plate 110 is toward the display surface 142 of the display unit 140, and the second OCA layer 150 is sandwiched between.

Figure 6:
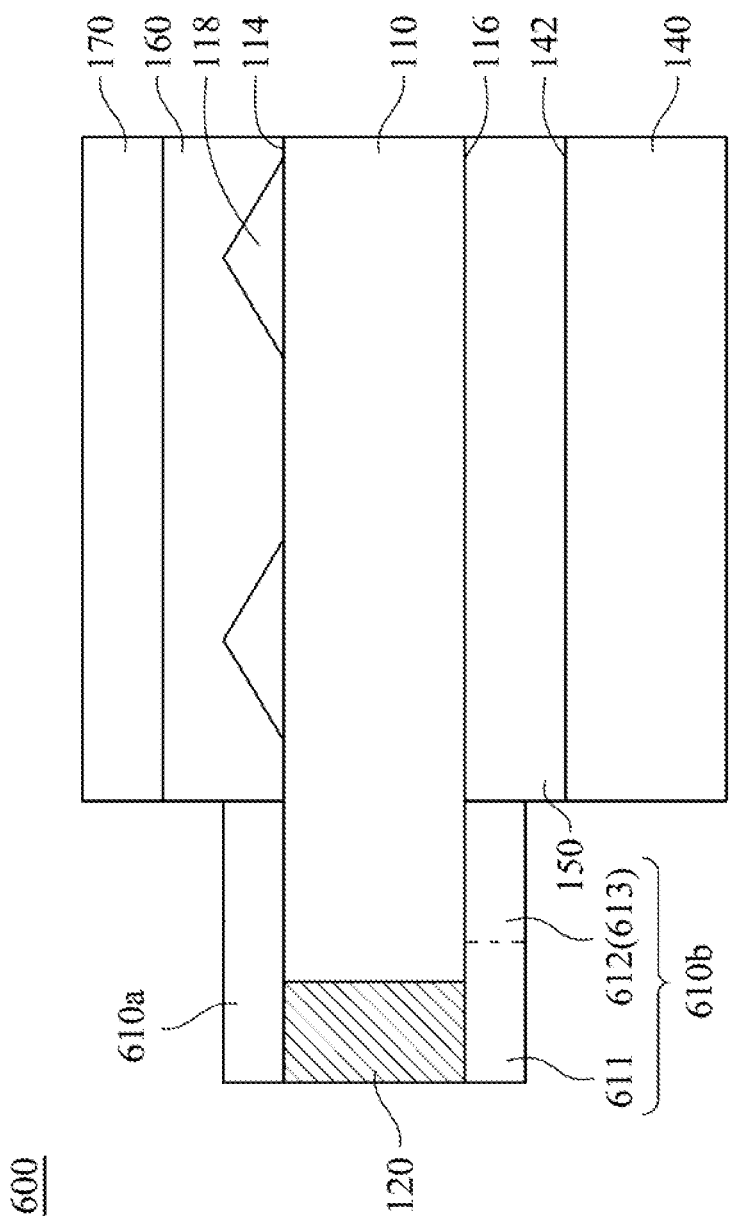
FIG. 6 is a schematic cross-sectional view of a light-emitting module 600 according to one embodiment of the present disclosure.

FIG. 6 is a schematic cross-sectional view of a light-emitting module 600 according to one embodiment of the present disclosure. In FIG. 6, a first light-adjusting film 610a is positioned over the light source 120 and the first light-extracting surface 114 of the light guide plate 110; and a second light-adjusting film 610b is positioned under the light source 120 and the second light-extracting surface 116 of the light guide plate 110. In an embodiment of the present disclosure, the second light-adjusting film 610b has a third light absorption portion 611, a plurality of fourth light absorption portions 612 and a plurality of second light reflection portions 613.

The third light absorption portion 611 is positioned under the light sources 120, and the fourth light absorption portions 612 and the second light reflection portions 613 are positioned on the light-adjusting area of the second light-extracting surface 116 of the first light guide plate 110. The fourth light absorption portions 612 are extended from projection positions 121 of the light sources 120 on the third light absorption portion 611, and one of the second light reflection portions 613 is located between two neighboring fourth light absorption portions 612, such that the fourth light absorption portions 612 and the second light reflection portions 613 are alternately arranged.

In an embodiment of the present disclosure, the second light-adjusting film 610b has a structure as the light-adjusting film 130 shown in FIG. 1, the light-adjusting film 230 shown in FIG. 2, the light-adjusting film 330 shown in FIG. 3 and the light-adjusting film 430 shown in FIG. 4. In another embodiment of the present disclosure, the second light reflection portions 613 of the second light-adjusting film 610b has a pattern as the light reflection portion 133 shown in FIG. 1, the light reflection portion 233 shown in FIG. 2, the light reflection portion 333 shown in FIG. 3 and the light reflection portion 433 shown in FIG. 4.

In FIG. 6, the first light-extracting surface 114 of the light guide plate 110 has an undulating microstructure 118. The first optical clear adhesive (OCA) layer 160 covers the undulating microstructure 118 and the first light-extracting surface 114 of the light guide plate 110, and the transparent protection layer 170 covers the first OCA layer 160. The second light-extracting surface 116 of the light guide plate 110 is toward the display surface 142 of the display unit 140, and the second OCA layer 150 is sandwiched between.

In embodiments of the present disclosure, the light-emitting module comprises the light guide plate, the light sources and the light-adjusting film. The light-adjusting film has the first light absorption portion, the second light absorption portions and the light reflection portions. The second light absorption portions are extended from projection positions of the light sources on the first light absorption portion, so as to absorb a part of light in front of the light sources to reduce the brightness of highlights. The light reflection portions s located between two neighboring second light absorption portions to reflect a light shinning on the first light reflection portions, so as to enhance the brightness of the shadows. Therefore, the light-adjusting film may be used to improve the hot spot of the light-emitting module and have a uniform brightness at a side frame of the display device.

Although embodiments of the present disclosure and their advantages have been described in detail, they are not used to limit the present disclosure. It should be understood that various changes, substitutions and alterations can be made herein without departing from the spirit and scope of the present disclosure. Therefore, the protecting scope of the present disclosure should be defined as the following claims.

What is claimed is:
1. A light-emitting module, comprising:
a light guide plate having a light-entering surface, a first light-extracting surface and a second light-extracting surface opposite to the first light-extracting surface, wherein the first light-extracting surface has a light-adjusting area;
a plurality of light sources for emitting light toward the light-entering surface of the light guide plate; and
a first light-adjusting film having a first light absorption portion, a plurality of second light absorption portions and a plurality of first light reflection portions, wherein the first light absorption portion is positioned over the light sources, the second light absorption portions and the first light reflection portions are positioned on the light-adjusting area of the first light-extracting surface, the second light absorption portions are protruded from a sidewall of the first light absorption portion, and when viewed from above the light guide plate, at least one of the second light absorptions and at least one of the light sources are arranged in a line substantially perpendicular to the sidewall of the first light absorption portion, and one of the first light reflection portions is located between two neighboring second light absorption portions, so that the second light absorption portions and the first light reflection portions are alternately arranged.

2. The light-emitting module of claim 1, wherein the first light absorption portion and the second light absorption portions are black.

3. The light-emitting module of claim 2, wherein the first light absorption portion and the second light absorption portions have a rough surface.

4. The light-emitting module of claim 1, wherein the first light reflection portions are white.

5. The light-emitting module of claim 4, wherein the first light reflection portions further comprise a reflective layer.

6. The light-emitting module of claim 5, wherein the reflective layer is a metal layer.

7. The light-emitting module of claim 6, wherein the material of the metal layer includes silver, aluminum or tin.

8. The light-emitting module of claim 1, wherein a pattern of the first light reflection portions is in rectangle, trapezoid, triangle, semicircle, semiellipse or a combination thereof.

9. The light-emitting module of claim 1, wherein a distance between two neighboring light sources is in a range of about 1 cm to 2 cm.

10. The light-emitting module of claim 1, wherein the second light absorption portions are extended in a range of about 0.3 cm to 1 cm, from the first light absorption portion.

11. The light-emitting module of claim 1, wherein the light sources are a point light source.

12. The light-emitting module of claim 11, wherein the point light source is a light-emitting diode.

13. The light-emitting module of claim 1, wherein a width of the light sources is in a range of about 3 mm to 6 mm.

14. The light-emitting module of claim 13, wherein a width of the second light absorption portions is greater than the width of the light sources.

15. The light-emitting module of claim 1, wherein the first light absorption portion and the second light absorption portions are formed a comb structure.

16. The light-emitting module of claim 1, further comprising a second light-adjusting film having a third light absorption portion, a plurality of fourth light absorption portions and a plurality of second light reflection portions, wherein the third light absorption portion is positioned under the light sources, the fourth light absorption portions and the second light reflection portions are positioned on a light-adjusting area of the second light-extracting surface, the fourth light absorption portions are extended from the third light absorption portion, and one of the second light reflection portions is located between two neighboring fourth light absorption portions, so that the fourth light absorption portions and the second light reflection portions are alternately arranged.

17. A display device, comprising:
a display unit having a display surface; and
the light-emitting module of claim 1 positioned on the display unit, wherein the second light-extracting surface of the light guide plate of the light-emitting module is toward the display surface of the display unit.

18. The display device of claim 17, wherein the display unit is a reflective display unit.

\* \* \* \* \*